United States Patent [19]
Bartell et al.

[11] Patent Number: 5,490,721
[45] Date of Patent: Feb. 13, 1996

[54] ANTI-LOCK BRAKE SYSTEM WITH MOTOR AND GEAR PUMP ASSEMBLY

[75] Inventors: Robert J. Bartell, Owasso; Calvin V. Kern, Lansing, both of Mich.

[73] Assignee: Eaton Tennessee, Inc., Eaton Rapids, Mich.

[21] Appl. No.: 343,772

[22] Filed: Nov. 22, 1994

[51] Int. Cl.⁶ ........................................ B60T 8/32
[52] U.S. Cl. .................... 303/116.4; 303/113.1; 303/113.2; 303/119.1; 303/10
[58] Field of Search ............................ 303/10–12, 116.3, 303/116.4, 61, 115.2, 119.1, 113.2, 113.1; 188/292; 417/426, 2–3, 410.1

[56] References Cited

U.S. PATENT DOCUMENTS

| | | |
|---|---|---|
| 2,270,222 | 1/1942 | Rea et al. |
| 2,334,629 | 11/1943 | James, Jr. |
| 2,496,497 | 2/1950 | Russell |
| 2,535,097 | 12/1950 | Seghers |
| 2,845,149 | 7/1958 | Stern et al. |
| 2,910,146 | 10/1959 | Peterson |
| 3,155,197 | 11/1964 | Lee et al. |
| 3,315,770 | 4/1967 | Wall |
| 3,498,420 | 3/1970 | Fawick |
| 4,477,125 | 10/1984 | Belart et al. ............... 303/10 |
| 4,840,436 | 6/1989 | Burgdorf et al. ........... 303/113.2 |
| 4,921,313 | 5/1990 | Arikawa .................... 303/116.1 |
| 5,013,096 | 5/1991 | Ocvirk et al. .............. 303/116.1 |
| 5,040,854 | 8/1991 | Arikawa .................... 303/116.1 |
| 5,183,317 | 2/1993 | Gutzeit ...................... 303/113.2 |

FOREIGN PATENT DOCUMENTS 5147524  6/1993  Japan .................. 303/116.4

*Primary Examiner*—Douglas C. Butler
*Attorney, Agent, or Firm*—Lorusso & Loud

[57] ABSTRACT

There is presented an anti-lock brake system including a motor and pump assembly for supplying brake fluid to the brake system, the assembly comprising an electric motor, and gear pumps driven by the electric motor and operative to provide the brake fluid under pressure to the brake system.

4 Claims, 5 Drawing Sheets

ANTI-LOCK BRAKE SYSTEM WITH MOTOR AND GEAR PUMP ASSEMBLY

BACKGROUND OF THE INVENTION

1. Field of the Invention

The invention relates to brake systems for vehicles, and the like, and is directed more particularly to an anti-lock brake system including a motor and gear pump assembly.

2. Description of the Prior Art

Anti-lock brake systems currently in use in automobiles and other vehicles receive brake fluid under pressure from an assembly including an electric motor and, typically, two reciprocating pumps. The electric motor typically drives an eccentric shaft which actuates reciprocating movement of pistons in the pumps. The pistons drive brake fluid under pressure through a delivery system to brakes mounted on the wheels of the vehicle. The reciprocating motion of the pistons, in conjunction with the high fluid pressures required, generates significant levels of vibration and noise.

There is a need for an anti-lock brake system including a motor and pump assembly which delivers brake fluid to the brakes with sufficient pressure and a high level of reliability, but without the usual accompanying vibration and noise.

SUMMARY OF THE INVENTION

An object of the invention is, therefore, to provide an anti-lock brake system including a motor and pump assembly for supplying brake fluid to the brakes of the system, which assembly operates at vibration and noise levels substantially below those of the current reciprocating pump type assemblies.

With the above and other objects in view, as will hereinafter appear, a feature of the present invention is the provision of an anti-lock brake system for wheeled vehicles. The system includes a brake for each wheel of the vehicle, a first control valve manifold in fluid communication with a manual brake activation means and adapted to be in communication with each of the brakes, and a second control valve manifold adapted to receive fluid from said first control valve manifold and adapted to be in fluid communication with the brakes. The system further includes an electronic control module in electrical communication with the control valve manifolds. A speed sensor is provided adjacent each of the wheels and is adapted to sense changes of speed of the adjacent wheel and communicate the sensed changes of speed to the control module. The system still further includes a motor and pump assembly for conveying brake fluid from the first control valve manifold to the second control valve manifold. The motor and pump assembly comprises an electric motor and a gear pump means adapted to receive brake fluid from the first control valve manifold and transmit the brake fluid to the second control valve manifold.

In accordance with a further feature of the invention, there is provided a motor and pump assembly for supplying brake fluid to an anti-lock brake system, the assembly comprising an electric motor having a drive shaft disposed centrally thereof and extending from at least one end of the motor, and a gear pump having a drive gear mounted on the motor shaft and operative to drive an idle gear mounted in the pump, the drive gear and the idle gear being operative cooperatively to receive brake fluid from a master cylinder and to supply brake fluid under pressure to a control valve manifold, whereby to provide brake fluid to the brake system.

The above and other features of the invention, including various novel details of construction and combination of parts, will now be more particularly described with reference to the accompanying drawings and pointed out in the claims. It will be understood that the particular system embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown illustrative embodiments of the invention, from which its novel features and advantages will be apparent.

In the drawings.

DESCRIPTION OF THE PREFERRED EMBODIMENTS

Figure 1:
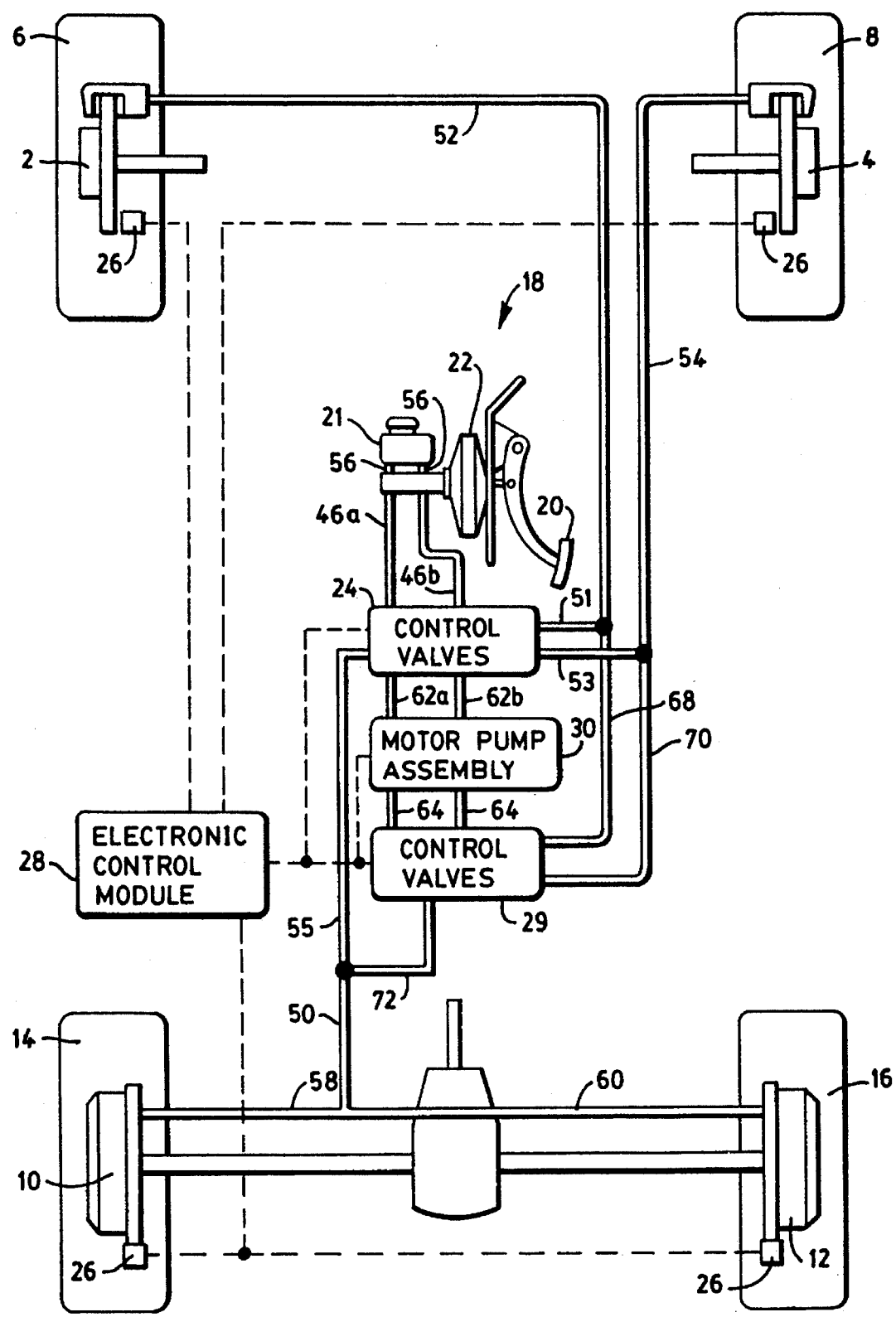
FIG. 1 is a diagrammatical illustration of an anti-lock brake system illustrative of an embodiment of the invention.

Referring to FIG. 1, it will be seen that an illustrative anti-lock braking system includes brakes 2, 4 associated with front wheels 6, 8, respectively. The front wheel brakes 2, 4 in a typical wheeled vehicle, such as a passenger car or light truck, usually are disc brakes, well known in the art. The braking system herein further includes brakes 10, 12 associated with rear wheels 14, 16, respectively. In passenger cars and light trucks, the rear wheel brakes typically are drum brakes, known in the art.

The brake system includes a manually operated brake system actuation means 18, usually including a foot pedal 20. The brake actuation means 18 includes a reservoir 21 of brake fluid and a brake master cylinder 22.

A first control valve manifold 24, known in the art, contains a number of valves for directing brake fluid to one or more of the brakes 2, 4, 10, 12, as may be appropriate.

Each wheel has adjacent thereto a speed sensor 26, which is operable to sense changes in speed of an adjacent wheel and transmit a signal indicative of such speed change (such as rapid deceleration) to an electronic control module 28 which, in turn, is in communication with the first control valve manifold 24 and a second control valve manifold 29, and is operative to direct brake fluid through first control valve manifold 24 to second control valve manifold 29 and, thence, to lines 68, 70 and 72 interconnecting the control valve manifold 29 and the brakes 2, 4, 10 and 12.

Figure 2:
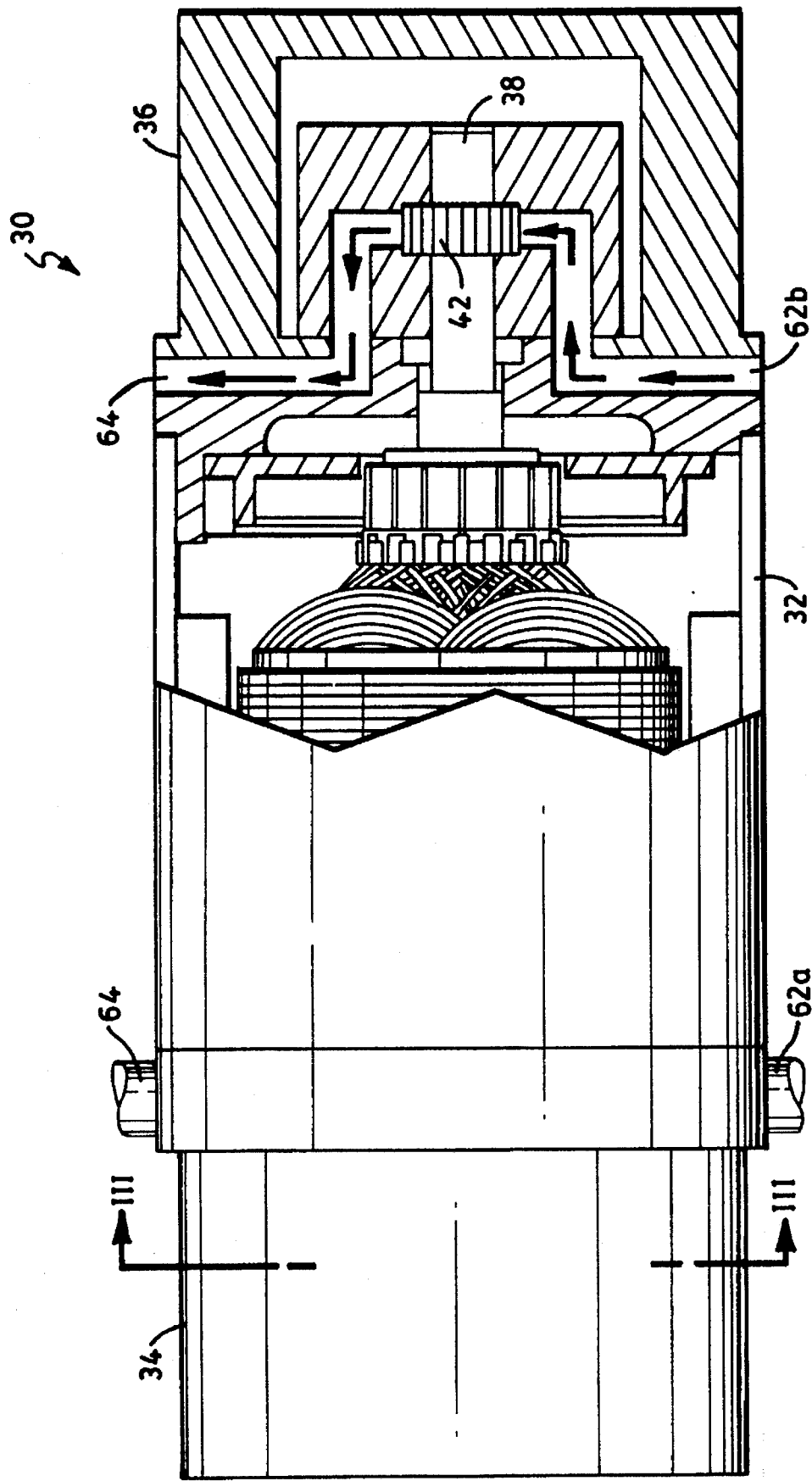
FIG. 2 is a partly elevational, partly broken away, partly sectional, and partly diagrammatic view of one form of a motor and pump assembly illustrative of an embodiment of the invention.
Figure 4:
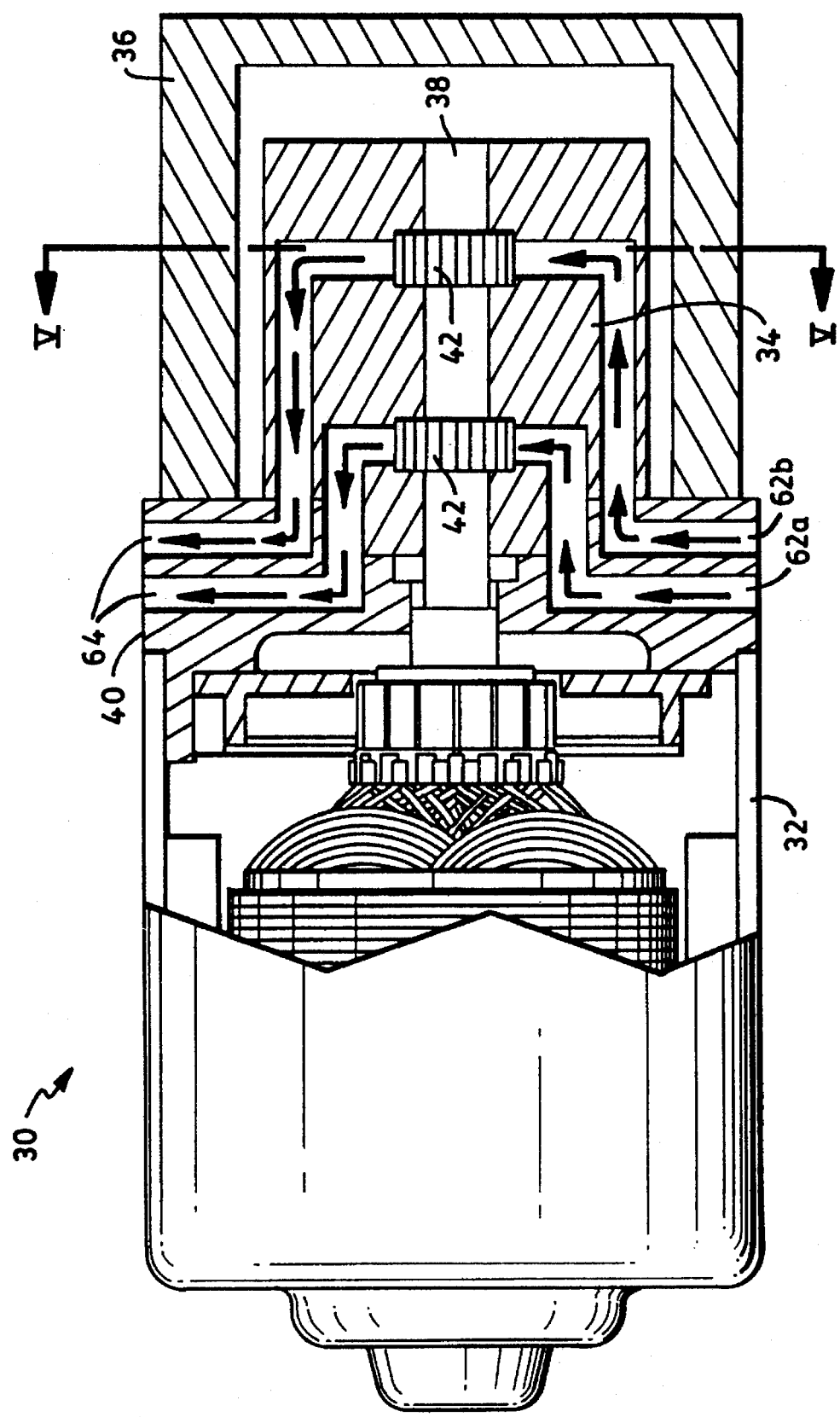
FIG. 4 is similar to FIG. 2, but shows another form of motor and pump assembly illustrative of an alternative embodiment of the invention.
Figure 5:
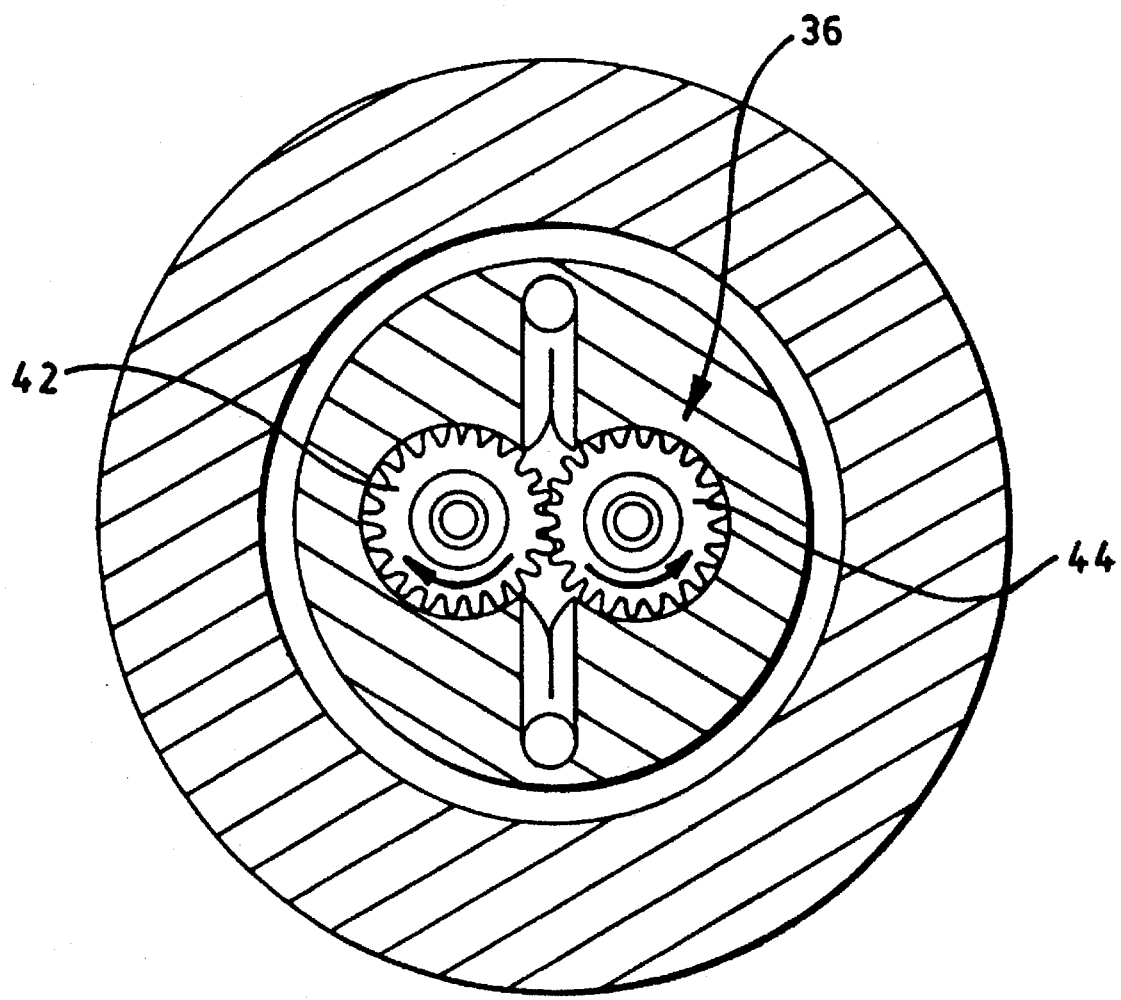
FIG. 5 is a sectional view taken along line V—V of FIG. 4.

Supplying brake fluid to the second control valve manifold 29 is a motor and pump assembly 30, including an electric motor 32 (FIG. 2) and first and second gear pumps 34, 36. The gear pumps 34, 36 may be mounted, one at each end of the motor 32, as shown in FIG. 2, or may both be mounted at one end of the motor 32 and adjacent each other, as shown in FIG. 4.

The motor 32 is provided with a central shaft 38 which extends beyond at least one end of the motor 32 and beyond a motor housing 40. For each pump, there is fixed to the central shaft 38 and turnable therewith, a drive gear 42 which meshes with an idle gear 44.

First control valve manifold inlet conduits 46a, 46b lead into the first control valve manifold 24 wherein brake fluid is routed therethrough to brake fluid lines 51, 53 and 55. Alternatively, the first control valve manifold 24 is adapted to route the brake fluid through conduits 62a and 62b to the pumps 34, 36. Pump outlet conduits 64 lead outwardly from the pump assembly 30 to the second control valve manifold 29. In the illustrative three channel system, three brake fluid conduits extend from the manifold 24, rear brakes conduit 55, left front brake conduit 51, and right front brake conduit 53.

In operation, when the foot pedal 20 is depressed normally by an operator, brake fluid flows from the brake master cylinder 22 (FIG. 1), through conduits 46a and 46b to the first control valve manifold 24, which routes the fluid to front wheels 6, 8 through lines 51, 53 and, thence, to left front brake conduit 52 and right front brake conduit 54, respectively. The first control valve manifold 24 further routes fluid through line 55 to rear brake conduit 50 and through left rear brake conduit 58 and right rear brake conduit 60 to rear wheel brakes 10, 12, the latter two conduits branching off from the rear brake conduit 50. Brake fluid is admitted to the master cylinder 22 from the brake fluid reservoir 21 by brake fluid make-up lines 56. Brake fluid in the conduits 46a and 46b flows through the control valve manifold 24 and directly to the brakes 6, 8, 10, 12.

From the first control valve manifold 24, brake fluid also enters the left front brake conduit 52 and the right front brake conduit 54. The supply of brake fluid to the brakes 2, 4, 10, 12, through their respective conduits 52, 54, 58 and 60, functions to operate the brakes to slow and/or stop the vehicle.

In a two channel system (not shown), the left front brake conduit 52 and the right front brake conduit 54 extend from a single front brake conduit extending from the control valve manifold.

In a four channel system (not shown), the left rear brake conduit 58 and right rear brake conduit 60 extend directly from the first control valve manifold 24.

In normal operation, the motor 32 is inactive, as are the gear pumps 34, 36 and the second control valve manifold 29.

Figure 3:
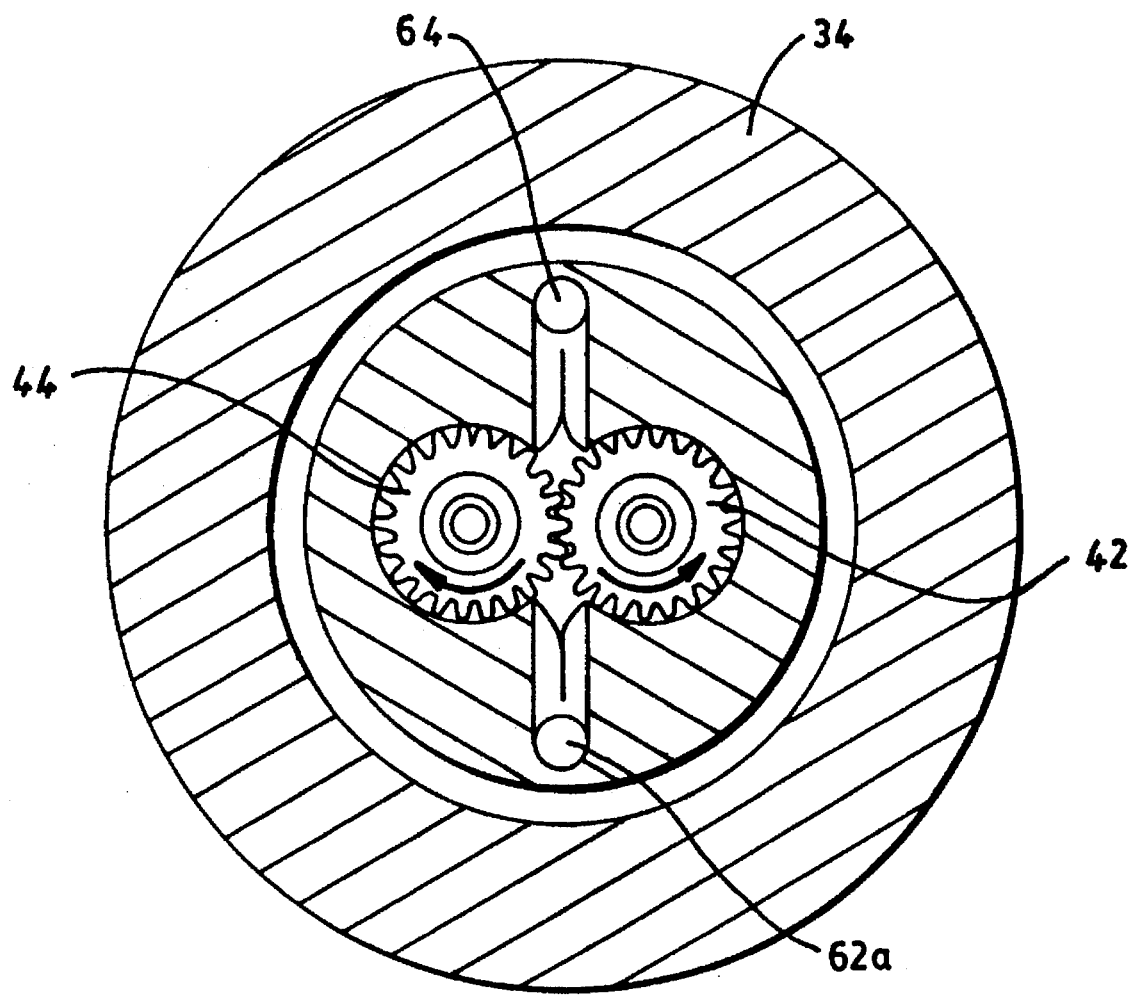
FIG. 3 is a sectional view, taken along line III—III of FIG. 2.

When the sensors 26 detect a problematic change of speed, as in a sudden and rapid deceleration, such is signalled to the electronic control module 28, which immediately "wakes up" and activates the motor and pump assembly 30 and the second control valve manifold 29 and orders the first control valve manifold 24 to close off lines 51, 53 and 55. In such mode of operation, fluid enters the motor and pump assembly 30 by way of conduits 62a and 62b. Pump outlets 64 conduct fluid to the second control valve manifold 29. Fluid flows in the pumps 34, 36 through conduits 62a, 62b to the gears 42, 44, around the longer peripheries of the gears, as illustrated in FIG. 3, and, under pressure, into the pump outlet conduits 64 and to the second control valve manifold 29. Valves (not shown) operate in the control valve manifold 29 in known fashion and, in accordance with instructions received from the electronic control module 28, dispatch fluid to the appropriate brake or brakes.

Thus, in normal operation, the application of brake fluid to the brakes is controlled by the manually activated brake system actuation means 18, but upon activation of the control valve manifolds 24, 29 and the motor and pump assembly 30 by the control module 28, the operator-actuated means 18 is out of the control loop, and electronic control module 28, the motor and pump assembly 30, and the second control valve manifold 29, operate automatically to control the brakes 2, 4, 10 and 12. Second control valve manifold 29 directs fluid from the pumps 34, 36 through left front brake line 68, to left front brake conduit 52, through right front brake line 70 to right front brake conduit 54, and through rear brake line 72 to rear brake conduit 50.

Upon passing of the emergency, the motor and pump assembly 30, the control valve manifolds 24, 29, and the electronic control module 28 return to the "normal" mode, and the system is again subject to manual operation. For the purposes of this disclosure, "manual" activation of braking system is meant to include power-assisted operation.

The gear pumps 34, 36 have been found to be reliable and quick-acting, and to deliver sufficiently high pressures, without the usual noise and vibration of previous systems in which piston-type pumps have been utilized.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. An anti-lock brake system for wheeled vehicles, said system comprising:

a brake for each wheel of said vehicle;

a first control valve manifold in fluid communication with a manual brake actuator and adapted to be in communication with each of said brakes;

a second control valve manifold adapted to receive fluid from said first control valve manifold and adapted to be in fluid communication with said brakes;

an electronic control module in electrical communication with said control valve manifolds;

a speed sensor adjacent each of said wheels and adapted to sense a change of speed of said adjacent wheel and communicate said change of speed to said control module; and a motor and pump assembly in electrical communication with said control module for conveying brake fluid from said first control valve manifold to said second control valve manifold;

said motor and pump assembly comprising an electric motor, and one gear pump adapted to receive brake fluid from said first control valve manifold and transmit said brake fluid to said second control valve manifold.

2. The brake system in accordance with claim 1 wherein said motor and pump assembly comprises first and second gear pumps, each of said gear pumps having a drive gear driven by a central shaft of said electric motor.

3. The brake system in accordance with claim 2 wherein said central shaft extends from both ends of said motor, and said first and second gear pumps are disposed, respectively, on said central shaft and proximate first and second ends of said motor.

4. The brake system in accordance with claim 2 wherein said central shaft extends from at least one end of said motor and said first and second gear pumps are disposed on said shaft proximate one end of said motor in side by side relationship.

* * * * *

UNITED STATES PATENT AND TRADEMARK OFFICE
CERTIFICATE OF CORRECTION

PATENT NO. : 5,490,721
DATED : February 13, 1996
INVENTOR(S) : Bartell et al.

It is certified that error appears in the above-indentified patent and that said Letters Patent is hereby corrected as shown below:

Column 4, line 65, Insert -- at least -- before "one gear pump".

Signed and Sealed this

Sixteenth Day of July, 1996

Attest:

BRUCE LEHMAN

Attesting Officer     Commissioner of Patents and Trademarks